Figure 9:
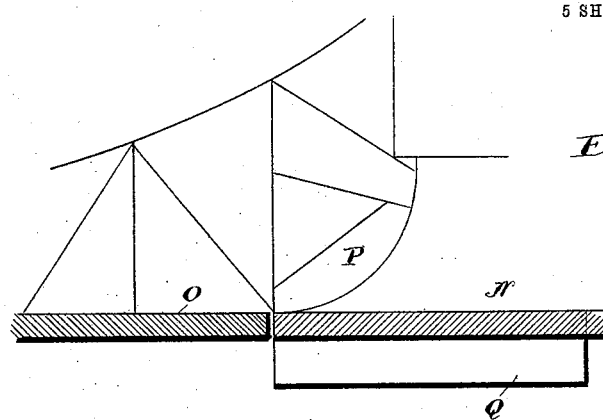

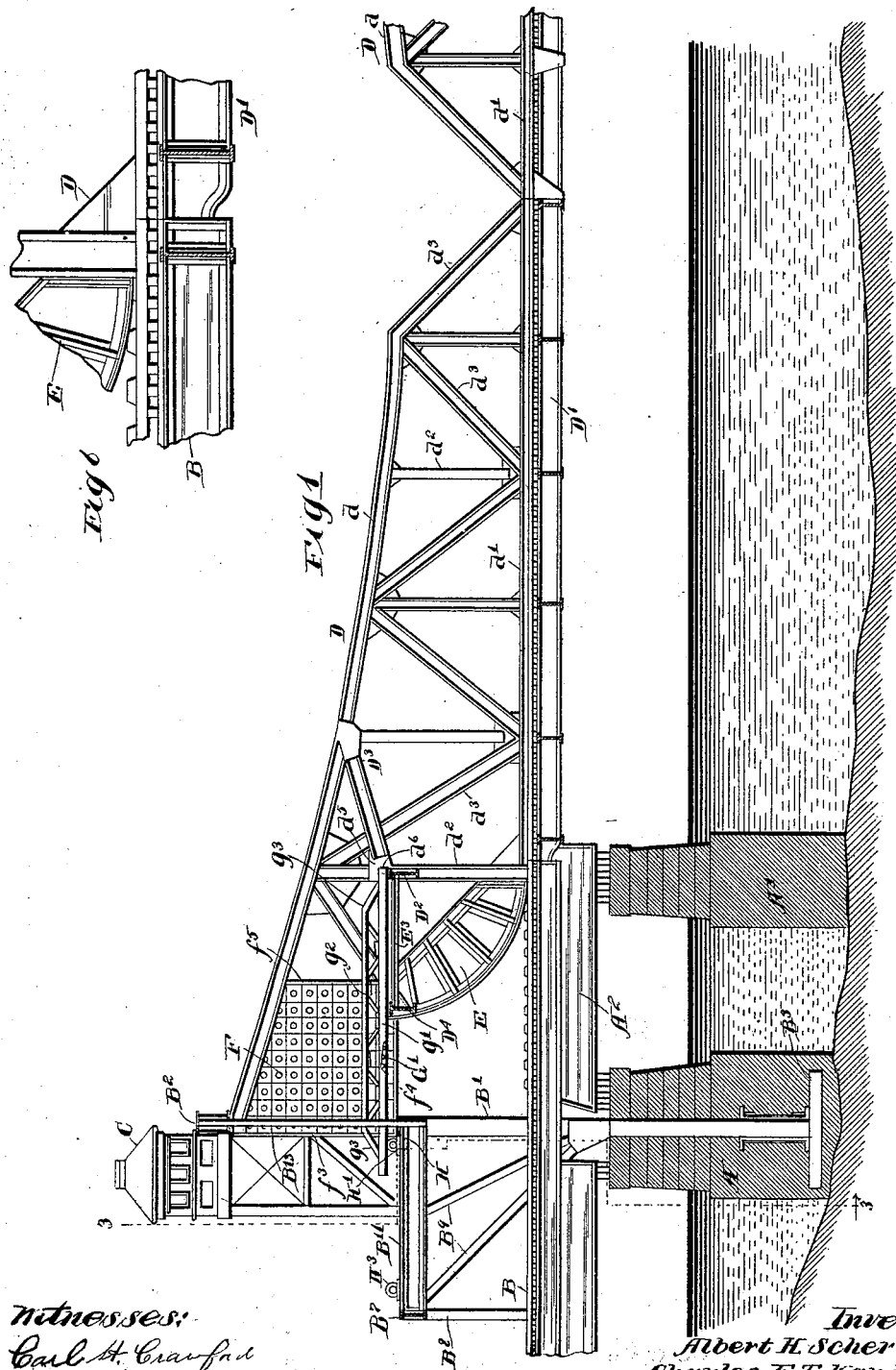

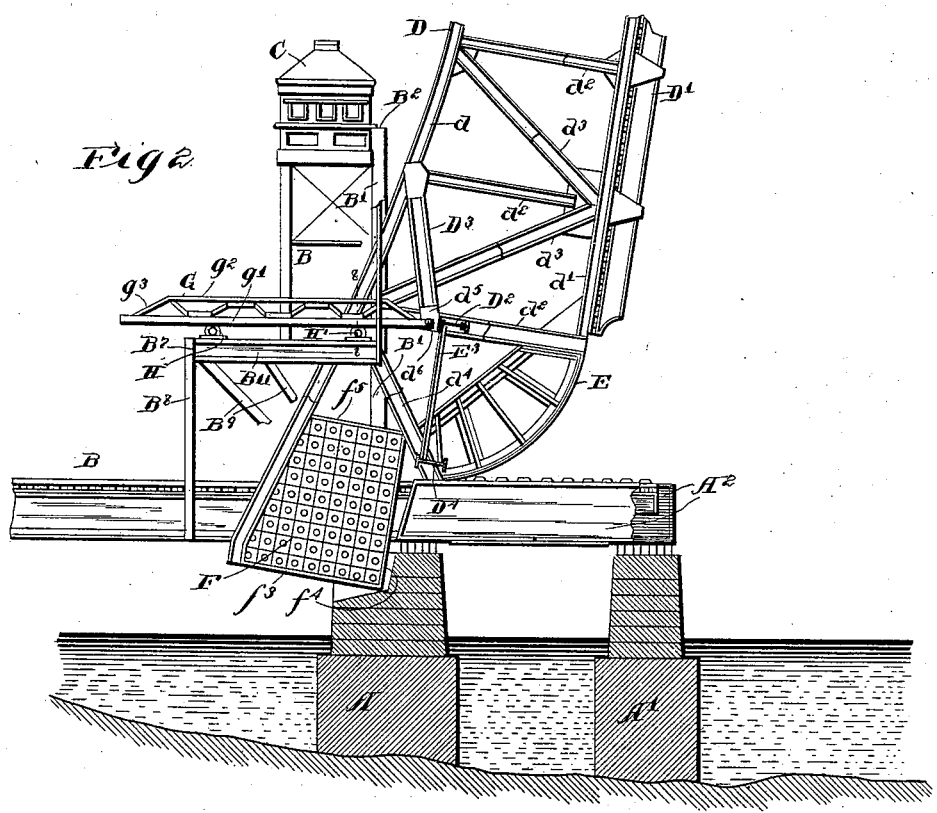
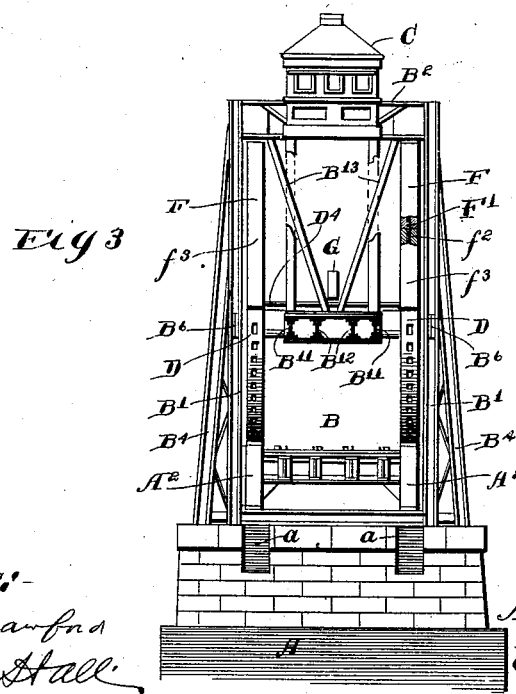

No. 721,918. PATENTED MAR. 3, 1903.
A. H. SCHERZER & C. F. T. KANDELER.
BASCULE BRIDGE.
APPLICATION FILED NOV. 22, 1901.
NO MODEL. 5 SHEETS—SHEET 3.
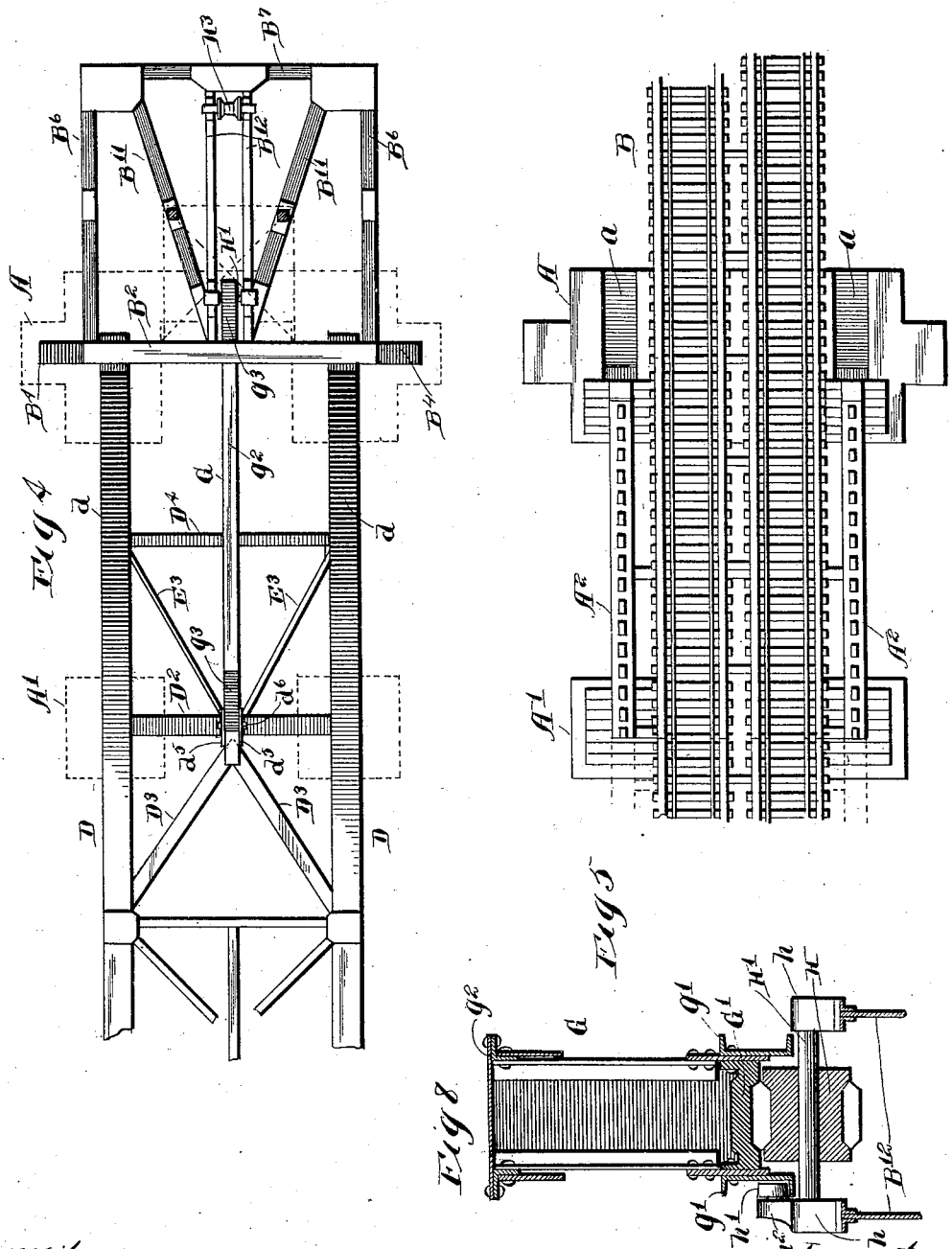

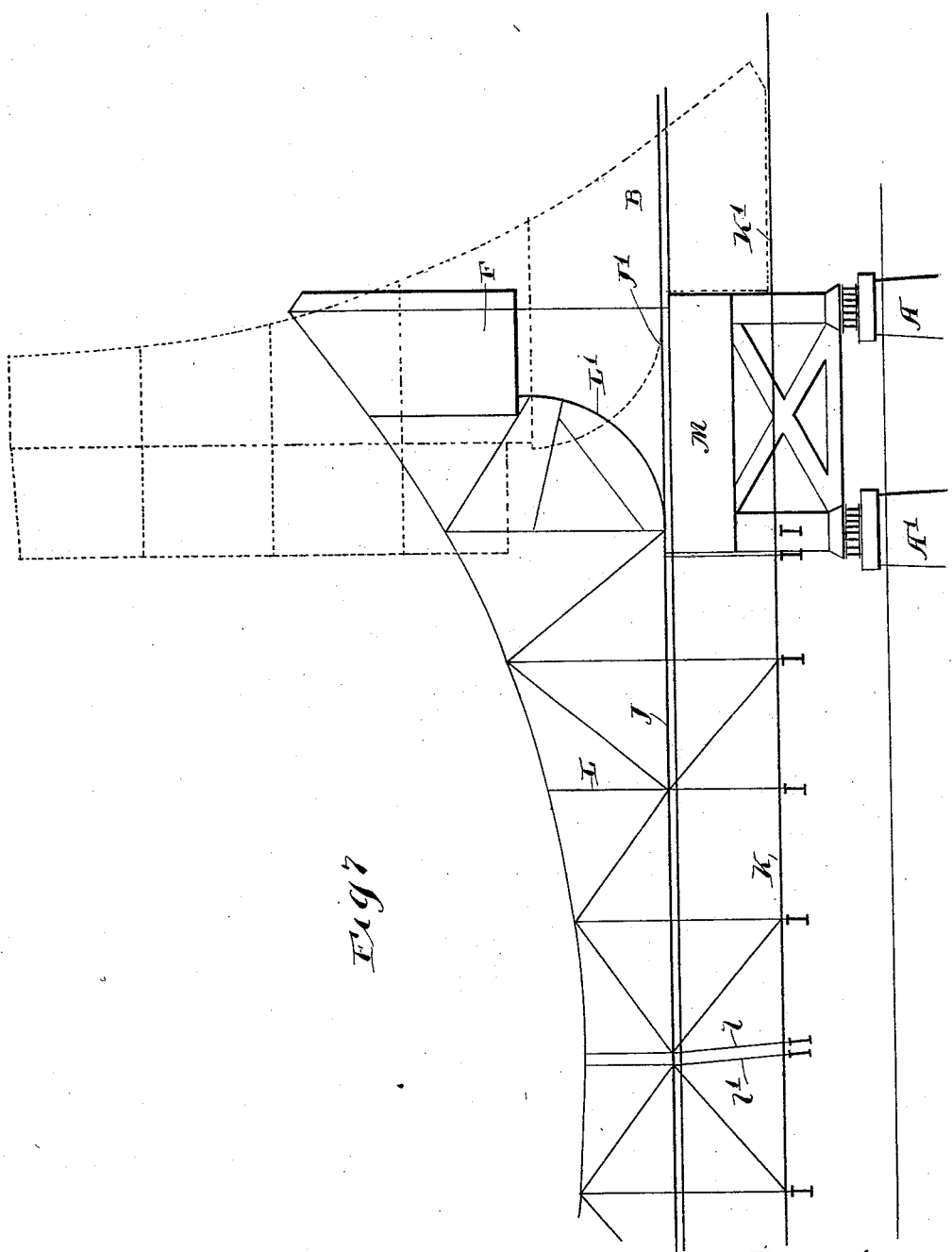

No. 721,918. PATENTED MAR. 3, 1903.
A. H. SCHERZER & C. F. T. KANDELER.
BASCULE BRIDGE.
APPLICATION FILED NOV. 22, 1901.
NO MODEL. 5 SHEETS—SHEET 5.

Witnesses:
Carl H. Crawford
George R. Wilkins

Inventors:
Albert H. Scherzer
Charles F. T. Kandeler
by Poole & Brown
Their Attorneys

UNITED STATES PATENT OFFICE.

ALBERT H. SCHERZER AND CHARLES F. T. KANDELER, OF CHICAGO, ILLINOIS, ASSIGNORS TO THE SCHERZER ROLLING LIFT BRIDGE COMPANY, OF CHICAGO, ILLINOIS, A CORPORATION OF ILLINOIS.

BASCULE-BRIDGE.

SPECIFICATION forming part of Letters Patent No. 721,918, dated March 3, 1903.

Application filed November 22, 1901. Serial No. 83,247. (No model.)

*To all whom it may concern:*

Be it known that we, ALBERT H. SCHERZER and CHARLES F. T. KANDELER, of Chicago, in the county of Cook and State of Illinois, have invented certain new and useful Improvements in Bascule-Bridges; and we do hereby declare that the following is a full, clear, and exact description thereof, reference being had to the accompanying drawings, and to the letters of reference marked thereon, which form a part of this specification.

The improvements constituting this invention relate to bascule or lift bridges of that kind wherein the bridge is opened and closed by the swinging movement of a movable span or spans in a vertical plane, and more particularly to the location and arrangement of the joint between the fixed abutment or approach and the movable span or spans, to the location of the counterweight on the movable span, to the location and construction of the actuating devices of the movable span, and to the location and construction of the stops for the movable span which limit the closing movement thereof and receive the stress brought thereon by the passing loads when the latter is in its closed or downward position, and to other features of construction in the bridge trusses, floor, approaches, and other parts of the bridge.

As shown in the drawings, Figure 1 is a vertical section of one leaf of a two-leaf bascule-bridge and its associated piers and approach and showing also in side elevation the inner or river end of the other leaf, which completes the bridge. Fig. 2 illustrates, principally in vertical section, the shoreward end of one of the leaves of the bridge, illustrating part of the approach and also the mechanism for swinging the span, said span being shown in its uppermost or open position. Fig. 3 is a transverse section on line 3 3 of Fig. 1. Fig. 4 is a sectional plan view of the bridge-approach and the adjacent end of the bridge-span. Fig. 5 is a plan view of the floors of one of the approaches and the floor of the adjacent end of the bridge-leaf, showing also the piers and girders on which the leaf is supported. Fig. 6 is an enlarged fragmentary view of the outer end of the bridge-span and the inner end of the stationary or approach structure and showing also a fragment of the curved member of the span, which rests and rolls on the horizontal supporting-surface. Fig. 7 is a diagrammatic view showing a double-deck bridge embodying some of the main features of our invention. Fig. 8 is a transverse section on line 8 8 of Fig. 2. Figs. 9, 10, 11, and 12 are diagrammatic views of the approach and bridge floors, rolling segments, and segment-supports, illustrating different positions of the said segments and their supports with respect to the roadway and the break in the same.

As shown in the drawings, A A' designate the shore-piers, on which are supported the bridge leaf or span and the inner end of the bridge-approach, said piers being built of masonry or constructed in any other suitable manner. We have herein illustrated in full but one leaf of the bridge, but have shown in Fig. 1 the end portion of an adjacent leaf. It will be understood, however, that a complete bridge may consist of a single leaf or span and that instead of joining the inner end of the leaf to another leaf said single leaf may rest when closed on an abutment at its rising and falling end.

B indicates the approach floor or roadway, which, as herein shown, is supported on the piers A A'.

C is an operating-house, which is supported on a framework above the bridge-approach.

D D designate as a whole the movable leaves or spans of the bridge.

The bridge illustrated is of the kind or type known as a "through-bridge," and it embraces two trusses and a bridge floor or floor-frame D', supported on the lower parts of the trusses or adjacent to the lower chords thereof, so that the said trusses rise above the level of the floor or roadway of the bridge and its approach.

It will of course be understood that the bridge illustrated may be either a highway or railway bridge and that the term "bridge-floor" as herein used refers to the floor-frame of a railway-bridge by which the track-rails are supported and which may have no flooring as well as to the flooring and its supports of a bridge for vehicles or pedestrians.

At the inner or shore end of the span the same is provided with rolling segments E E, which are attached to and form parts of the trusses and are adapted to rest and roll on horizontal supports $A^2 A^2$, which are located at either side of the approach-floor B. Anchored columns B' B' are located at either side of the bridge-approach, and the bridge-trusses are at the inner or shore end of the span extended beyond the rolling segments, so as to form rigid extensions or arms, which are adapted for upward contact with limiting-stops on the columns B' B', which stops are formed by a horizontal beam or girder $B^2$, which is attached to said columns and extends over the approach B. The extensions of the trusses when the span is closed or in its horizontal position bear upwardly against said girder, and thereby hold from downward movement the free end of the span. The bridge-span is also provided with counterbalance-weights F F, which are attached to the bridge-trusses with their centers of gravity outside of and above the upper ends of the rolling segments, the same being attached to the projecting parts of the trusses which extend beyond said segments, as hereinbefore set forth.

The trusses of the bridge-span, of which there may be two or more, according to the width of the bridge, as herein shown, consist of curved top chords $d$, straight bottom chords, and vertical and oblique connecting members $d^2 d^3$, the top chord being inclined from the outer or shore end of the span downwardly toward the inner or swinging end thereof. The rolling segments E E illustrated have the form of sector-shaped beams, which are obliquely disposed and are attached at their lower ends to the adjacent ends of the bottom chords $d'$ and to the lower ends of the outermost upright truss members $d^2$. At their upper ends the sector-shaped beams E are attached to oblique truss members $d^4$, which latter are attached at their upper ends to the top chords at the intersection of the latter with the upright truss members $d^2$.

The supports $A^2$ for the rolling segments E are shown as having the form of girders $A^2 A^2$, which rest on the piers A A' at the sides of the floor of the bridge-approach. Manifestly, as in the case of a bridge having a solid abutment, said supports may be otherwise made and rest on any suitable foundations. The curved faces of the rolling segments and the top surfaces of the supports are provided with means for preventing the slipping or shifting of the segments on the supports, the same, as herein shown, consisting of teeth arranged at intervals along the supports and holes or recesses in the curved faces of the segments adapted to receive said teeth.

From the above it will be manifest that in the construction illustrated the roadway or floor of the approach extends from the abutment or shore outwardly to or beyond the outer ends of the supports $A^2$, on which the rolling segments rest, and that the said supports are located at or above rather than below the level of the bridge-approach, while the said segments are above the level of the bridge-approach and of the bridge-floor and as a whole are located at the land or shoreward side of the end of the bridge-floor or line at which the bridge-floor joins the approach floor or roadway when the bridge is closed. As a result of this arrangement of the parts no portion of the bridge-floor descends when the span is swung upwardly in opening the bridge, but its end adjacent to the supports of the span rises as the rolling segments roll on the said supports.

In the specific construction shown in the drawings the shore end of the bridge-floor D' is located at or near the upright end members $d^2$ of the trusses, and the sector-shaped beams forming the rolling segments being attached at their lower ends to the said upright member and the adjacent end of the lower chord the bearing or contact surfaces of said rolling segments and the top surface of the supports $A^2$ therefor are brought at or slightly above the level of the upper surfaces of the bridge and approach floor, while the lower ends of said rolling segments are in rear of or exterior to the adjacent end of the bridge-floor. As a result of this construction and arrangement when power is applied to lift the leaf or span the shore end of the bridge-floor moves outward and upwardly from the outer end of the floor of the approach B. In other words, referring to the position of the parts when the bridge is closed, the rolling segment is located above the plane of the top of the floor or roadway of the bridge and its approach, with its lower or outer end at the inner or shoreward side of a vertical plane coinciding with the meeting ends of the bridge and approach floors, the result being that when the span is closed and its outer end is lifted to open it the end of the bridge-floor will move endwise and upwardly away from the end of the abutment-floor as the span begins to move, and in closing the span the end of the bridge-floor will approach the end of the abutment-floor horizontally at the end of its closing movement, and that neither in opening or closing will the shoreward or inner end of the bridge-floor drop below the approach floor or roadway. Manifestly these results will follow if the forward ends of the rolling segments be located either near or outside of a vertical plane passing through the joining-line of the bridge and approach floors and if the lower curved surface or treads of the rolling segments be located either near or above a plane coinciding with the top surfaces of the approach-floors at their meeting-line.

The construction described in the location of the rolling segments is distinguished from the prior construction wherein the said members are located below the level of the floor-frame and inside the outer end of the bridge, for the reason that in such prior construction the floor-frame of the bridge-leaf swings downwardly below and past the floor-frame of the approach. The construction herein set forth possesses the advantage that the inner end of the leaf being raised above the approach when the leaf is opened and not descending below the same it becomes unnecessary to provide a depression or well to receive the inner end of the bridge-floor, or that at the shoreward side of the supports, and in a bridge spanning a waterway the bridge-floor need be elevated only a short distance above the water-level.

The counterbalance-weights, which are designated as a whole by the reference-letter F, are so located that the center of gravity thereof is above the level and outside of the inner or upper ends of the rolling segments. By locating the counterweights above the level of the upper ends of the said segments the said counterweights when the bridge is open will not be carried materially below the level of the horizontal supports on which the segments rest and will not, therefore, descend materially below the level of the approach floor or roadway. As a consequence no space need be provided for the descent of said counterweights, and the bridge may be near the surface of the water of a waterway without the necessity of providing a well or inclosure for the said counterweights. Said counterweights are illustrated as attached to the bridge-trusses, generally as shown in our application filed of even date herewith, Serial No. 83,248, the trusses being provided each with plates or webs $f$, built in or attached at its margins to the truss members, and a plurality of separate weights $f'$ being attached by bolts to said plates.

For the support of the counterweights, as well as to provide a rigid extension of the truss shoreward from the segments E for engagement with the girder $B^2$, the upper chord $d$ of the truss is extended past the upright $d^2$ and over the upper end of said segment and is attached at its end to an upright truss member $f^3$, which extends downwardly therefrom and is attached at its lower end to a horizontal truss member $f^4$, which latter is attached to the oblique truss member $d^4$. A second upright $f^5$ is attached at its upper end to the chord $d$ and at its lower end to the said oblique member $d^4$. The said plate $f$ is secured at its edges to the chord $d$ and to the truss members $f^3 f^4 f^5$, and said plate forms, in effect, part of the truss. The counterbalance-weights being located in the planes of said trusses exert power in direct line with said trusses. In order to accommodate the counterbalance-weights when the leaf is open, small notches or recesses $a$ are provided in the upper and outer parts of the outermost pier A to receive said counterweights, as shown in Figs. 2 and 3. The approach-floor B is made of such width as to permit the counterweights to pass downwardly on either side thereof when the leaf is thrown open.

The columns B' B' extend at their lower parts into and are embedded in the pier A, said lower ends of the columns being secured to anchor plates or crabs $B^3$ to resist the upward pull coming thereon when the span is in its lowered or closed position. Said columns are laterally supported by means of lateral braces $B^4$, Fig. 3, which are attached at their upper ends to the columns B' and are set at their lower ends into the piers A.

Next referring to the actuating mechanism by which the bridge-leaf is opened and closed, G designates an operating-strut, which is arranged centrally over the floor or roadway and is pivotally connected with the upper part of the bridge-span, which latter is provided with transverse and oblique beams or braces rigidly connecting the pivots of the operating-strut with the upper parts of the trusses. In the particular construction herein shown a horizontal beam $D^2$ extends between the end upright members $d^2$ of the trusses, and to the central part of said transverse beam are attached oblique braces $D^3 D^3$, which extend outwardly and upwardly and are attached at their opposite ends to the upper chords $d\ d$ of the trusses. Other oblique braces $E^3 E^3$ extend from the central part of said beam $D^2$ of the truss member $D^4$ at a point adjacent to the upper ends of the segments E. At the intersection of the oblique braces $D^3$ and $E^3$ with the cross-beam $D^2$ are located cheek-plates $d^5 d^5$, between which the forward end of the operating-strut is located and with which the same is pivotally connected by a horizontal pivot-pin $d^6$. Said operating-strut G is provided with a downwardly-facing rack-bar G', which engages a toothed pinion H, affixed on a rotative shaft H', mounted horizontally over the bridge-approach, said shaft and pinion, in connection with the rack-bar on the operating-strut, serving to give endwise movement to the same and to thereby effect the raising and lowering of the bridge-span. Provision is made for supporting the rotative shaft H' and parts of the actuating mechanism for the strut as may be associated therewith, embracing two parallel horizontal beams $B^{12}$, which are located over the bridge-approach below the level of the operating-strut, but high enough above said approach to permit the passage of traffic. Said girders are located at their forward or outer ends between the end portions of the bridge-trusses and the counterbalance-weights thereon, which move in vertical planes at either side of said girders in the closing and opening of the bridge, and in order to support said girders so as to avoid interfering with the movement of the span the forward ends of the girders $B^{12}$ are suspended or supported from the transverse girder $B^2$, which, as before stated, is attached to the upper ends of the columns $B'$ and extends over the approach-roadway. In the particular construction illustrated said inner ends of the girders $B^{12}$ are supported by means of oblique suspension-bars $B^{13}$, attached at their upper ends to the girder $B^2$ and at their lower ends to the ends of said girders $B^{12}$. The rear or inner ends of said girders $B^{12}$ are attached to a transverse horizontal girder $B^7$, which is supported at its ends by vertical columns $B^8$, located on either side of the approach-roadway. In view of the fact that the action of the actuating mechanism on the operating-strut in lifting the bridge-span will tend to move the said girders $B^{12}$ endwise toward the span the upper ends of the columns $B^8$ are connected with the columns $B'$ by horizontal girders $B^6$ and are braced from the lower ends of the columns $B'$ by means of oblique struts $B^9$, and said upper ends of said columns $B^8$ are connected with the outer ends of the girders $B^{12}$ by means of horizontally-arranged oblique braces $B^{11}$, which are attached at their outer and rear ends to the upper ends of the columns $B^8$ and to the transverse and longitudinal girders $B^6$ and $B^7$, said oblique girders being attached at their forward ends to the said girders $B^{11}$, so as to transmit directly to the posts $B^8$ the end pull coming upon the girders $B^{12}$ in the operation of the bridge-span. In the particular construction shown the framework, consisting of the columns $B^8$, the transverse girder $B^7$, and the longitudinal girders $B^6$, together with the posts $B'$, constitutes a support for the operating house or tower C, which latter is sustained at one side upon said transverse beam $B^2$ and at its other side on columns which rest upon the horizontal beams $B^{11}$.

The girders $B^{12} B^{12}$ will be used to afford support for such part of the actuating mechanism for driving the shaft $H'$ as it may be necessary to locate adjacent to said shaft—as, for instance, if said shaft is driven by an electric motor the same may be placed on said girders, together with intermediate gearing between said electric motor and said shaft $H'$.

To provide means for supporting the outer end of the operating-strut when in its rearmost position or at the time the leaf of the bridge is raised, as shown in Fig. 2, a roller $H^3$ is mounted on the girders $B^{12} B^{12}$, said roller being provided with side flanges adapted to engage the lower surface of the said strut at either side of the rack-bar thereon. When the leaf is closed, the operating-strut will be forward or free from the said roller $H^3$ and will be supported on the gear-pinion H and on said pivot bar or rod $d^6$. In the particular construction shown the operating-strut G is of truss construction, having lower horizontal members $g'$, to which the rack-bar $G'$ is directly attached, an upper horizontal member $g^2$, and oblique members $g^3$, connecting said upper and lower members. Said bar $D^2$, to which the forward end of the operating-strut G is attached, is located at the center of a circle whose circumference coincides with the curved edge of the rolling segment E, so that in the backward and forward movements of the operating-strut in opening and closing the bridge said strut always maintains its horizontal position and moves in a straight horizontal line. The weight of the strut G is ordinarily sufficient to prevent the same rising from and getting out of mesh with the gear-pinion H in the opening and closing movements of the bridge. In order, however, to prevent said strut from rising under unusual or extraordinary stresses brought thereon, bearing-rollers $h'$ are provided, which are mounted in upwardly-directed arms $h^2$, rising from the bearings $h$, said rollers projecting over the bottom flanges of said channel-plates $g'$ in position to prevent the strut rising sufficiently to disengage the same from the actuating gear-pinion H. The location of the operating-strut at the center of the bridge-span, in connection with operating devices therefor located over the bridge-approach, is of especial advantage for use in connection with a bridge of the type illustrated—namely, a through-bridge—for the reason that by this construction the power is applied to the span at the point most effective for moving the bridge—namely, at the level of the upper parts of the trusses—while at the same time one operating-strut and associated parts only is required for the span instead of one for each truss, and the construction is therefore made much more simple and cheaper to build.

As hereinbefore stated, the columns $B' B'$ and girder $B^2$ operate in connection with outward projections on the ends of the trusses for limiting the closing movement of the bridge-leaf when the same has reached its lowermost or substantially horizontal position and for taking the stress of loads on the bridge. In the particular construction herein illustrated the upper chords $d$ of the trusses are extended so as to reach to points beneath the ends of the girder $B^2$, so that the ends of the girder $B^2$ constitute the downwardly-facing stops for the bridge-span, and the outer ends of the top of said chords constitute the stops on the span. When the bridge occupies its closed or horizontal position, the outer ends of said top chords engage the lower margin of the said transverse girder $B^2$ at points inside of and adjacent to the columns $B'$, and the upward thrust of the outer end of the leaf, due to the load on that part of said leaf extending beyond its supports, is thereby transmitted to the horizontal beam or girder $B^2$ and therethrough to the vertical columns $B'$.

In Fig. 7 we have shown diagrammatically a double-decked bridge embracing the general features of construction above set forth. In this figure, J indicates the upper and K the lower bridge floor, one of which may support railway-tracks and the other form a highway-bridge. The upper floor J is in this instance supported by trusses L, made substantially like those hereinbefore set forth and provided with rolling segments L', resting on supports M and so disposed with respect to the end of the upper floor J that the latter will move outwardly and upwardly from the end of the upper approach-floor J' when the span is lifted. The lower bridge-floor K is shown as hung from the truss L by suitable supporting members, and its shore end being located below the level of the rolling segments L' is adapted to move upwardly and away from the lower approach K' in the lifting of the span in the same manner as the end of the upper floor J moves away from the upper approach J'. Manifestly in a span having upper and lower floors the lower chords of the trusses may be adjacent to the lower floor, in which case the said lower floor will be carried directly by the trusses instead of being suspended therefrom, the results produced being substantially the same if the rolling segments be so located with respect to both floors that the ends of the same rise and move outwardly from the ends of the approach-floors in the lifting of the span.

It is to be noted that the end suspension-uprights $l$ $l'$ of the span L and its associated span are made somewhat inclined or oblique, this construction being employed in order to prevent interference of the ends of the lower floors of the two spans with each other in raising and lowering the spans.

Figure 10:
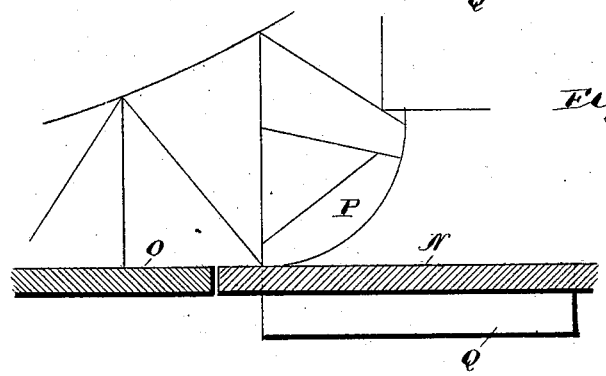
Figure 11:
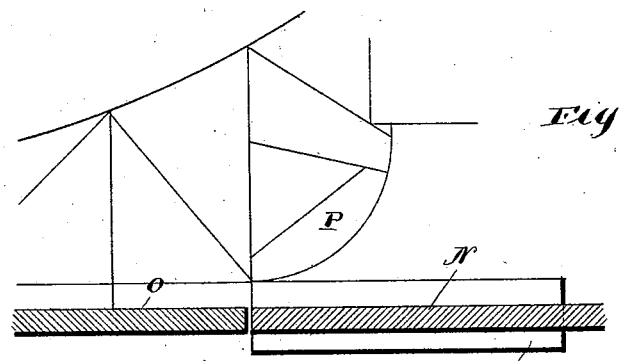
Figure 12:
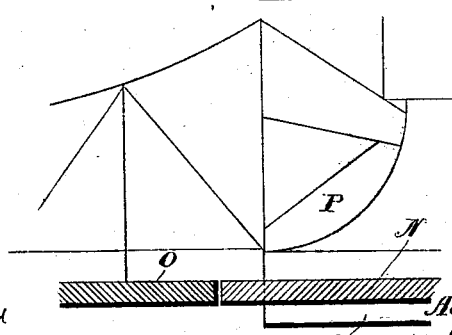

In Figs. 9, 10, 11, and 12 are shown diagrammatically several different positions of the rolling segments and their supports with respect to the break in the roadway between the approach and span floor, adapted to enable the span-floor to move upwardly and away from the approach in the lifting of the span. In these several figures, N indicates the approach-floor; O, the span-floor; P, the rolling segments, and Q the supports for the rolling segments. In Fig. 9 the top of the approach and bridge floors are in the same plane with the supports Q, while the inner end of the span-floor meets the approach-floor in a vertical plane coinciding with the outer ends of said supports. In Fig. 10 the approach-floor extends outwardly beyond the supports Q, while the span and approach floors are at the same level as the said supports. In Fig. 11 the supports Q terminate in line with the joint between the span and approach floors; but the said support Q is above the level of the floors. In Fig. 12 the supports Q for the segments are located both above the level of the roadway and exterior to the shore end of the span-floor. From the above it will be understood that the supporting-surfaces for the rolling segments and said segments themselves may be located in various positions so long as when the bridge is closed they are both above and exterior to the shore end of the floor or floor-frame of the span. It will also be obvious that the contact-surfaces of said supports and segments cannot be located materially below the level of the top of the span-floor, nor can the shore end of the span-floor extend to any considerable extent beyond or past the outer ends of the said supports M, (or the span ends of the rolling segments,) because in either case the shore end of the span-floor would move toward the approach-floor in the initial movement of the span.

In practice the upper surfaces of the supports for the rolling segments will be located above the level of the floor-frame proper, although in the case of a highway or railway bridge they may be slightly below the level of the top of the guard-stringers or track-rails, which extend above the top surface of the floor-frame or floor proper, without preventing the proper operation of the span, the slight space or clearance between the approach and span floors affording some latitude in this respect. The form of construction shown in the diagram Fig. 9 is substantially like that illustrated in Figs. 1 to 6, the upper surfaces of the supporting-girders $A^2$ $A^2$ being well above the level of the beams constituting the floor-frame itself and about on a level with the tops of the track-rails on the bridge.

An important feature of our invention is embraced in the feature of a rolling-lift-bridge span in which the floor or floor-frame is located adjacent to the level of the bottom chords of the trusses, thereby forming a "through-bridge" of the rolling-lift type. The important advantage gained by this feature of construction is that it makes it possible to construct a rolling-lift bridge in which the bridge-floor is at a low level—for instance, one in which the floor-level is only a short distance above the level of the water in a waterway spanned by the bridge. Prior to the present invention the bridge-floor in a rolling-lift bridge has been located above the level of the lower chords of the span-trusses, and therefore above the rolling segments, to the lower ends of which the said lower chords extend, because when the span is lifted or partially lifted the trusses are supported entirely by the said segments, and the lower chords are carried to the lower ends of the segments in order that a suitably strong and rigid connection may be made between the trusses and said segments. In the present construction the floor is brought adjacent to the level of the said lower chords and the rolling segments are located at the sides of the roadway and above or mainly above the level thereof, a feature which, so far as we are aware, is entirely novel in rolling-lift bridges and which is of great value because enabling a bridge of this type to be employed in cases where the prior forms of construction used in such bridges were inapplicable or could not be economically used.

Certain of the features of construction hereinbefore set forth are adapted for use in connection with bascule-bridges of other kinds than that herein shown, as well as in connection with the rolling-lift bridge herein illustrated—as, for instance, the devices hereinbefore described for operating the span and for limiting the downward movement of the free end of the span may be used in connection with such pivoted bascule-bridges, and those of the appended claims which relate to features applicable to bascule-bridges of other types than the rolling-lift bridges are intended to cover such features as applied both to the rolling-lift bridge illustrated and to other forms of lift-bridges to which the same may be applicable.

It is obvious that many changes may be made in the structural details illustrated without departing from the spirit of the invention, and we do not wish to be limited to such details except as hereinafter made the subject of specific claims.

We claim as our invention—

1. A rolling-lift-bridge span or leaf embracing trusses, rolling segments attached to said trusses and a bridge-floor located adjacent to the level of the lower chords of the trusses.

2. A rolling-lift-bridge span or leaf, comprising trusses and rolling segments attached to said trusses, the bottom chords of said trusses being approximately horizontal and the floor of said span or leaf being located adjacent to the level of said bottom chords.

3. A rolling-lift-bridge span or leaf embracing trusses, a floor located adjacent to the level of the lower chords of the trusses, and rolling segments attached to the ends of said trusses.

4. A rolling-lift-bridge span or leaf embracing trusses, rolling segments attached to said trusses, a bridge-floor located adjacent to the level of the lower chords of the trusses, and overhead laterals connecting the upper parts of the trusses.

5. A rolling-lift bridge, comprising a bridge span or leaf, provided with rolling segments, and stationary supports for said segments, the floor of the span or leaf being located with its top surface near the level of the said stationary supports.

6. A rolling-lift bridge comprising a bridge span or leaf provided with rolling segments, and stationary supports for said segments, the trusses of said span or leaf having approximately horizontal lower chords, and the floor thereof being located adjacent to the level of said lower chords with its top surface near the level of the said stationary supports.

7. A rolling-lift bridge provided with an approach floor or roadway, a span or leaf provided with rolling segments, and stationary supports for said rolling segments, the span floor or roadway being arranged to meet the approach floor or roadway adjacent to the outer ends of said stationary supports.

8. A rolling-lift bridge provided with an approach floor or roadway, a span or leaf provided with rolling segments, and stationary supports for said rolling segments; the span floor or roadway being arranged to meet the approach floor or roadway in such manner that the end of the said span floor or roadway will move upwardly away from the adjacent end of the approach floor or roadway in the lifting or opening movement of the span.

9. A rolling-lift-bridge span or leaf provided with rolling segments located above the level of and exterior to the end of the span-floor which meets the approach floor or roadway.

10. A rolling-lift bridge comprising an approach floor or roadway, a span or leaf provided with rolling segments located above the level of and exterior to the end of the span-floor which meets the said approach floor or roadway, and stationary supports for the said rolling segments located at either side of said approach floor or roadway.

11. A rolling-lift-bridge span or leaf provided with rolling segments which rest on stationary supporting-surfaces, said segments being located above and exterior to the end of the span-floor which meets the approach floor or roadway and with a counterbalance-weight located above and exterior to the said rolling segments.

12. A rolling-lift-bridge span or leaf provided with rolling segments which rest on stationary supporting-surfaces, and which are located above and exterior to the end of the span-floor which meets the approach floor or roadway, the trusses constituting the span or leaf being extended outwardly above and beyond the said rolling segments and being adapted for contact with downwardly-facing stops on the bridge approach or abutment.

13. A rolling-lift-bridge span or leaf provided with rolling segments which rest and roll on stationary supporting-surfaces, and which are located above and exterior to the end of the span-floor which meets the floor approach or roadway, said span or leaf embracing two trusses which are extended beyond the outer or upper ends of said rolling segments and the upper chords of which extend to the outer end of said extension and stops on the bridge approach or abutment adapted for contact with the ends of said top chords to limit the downward movement of the span when in its closed position.

14. A rolling-lift-bridge span or leaf, provided with rolling segments adapted to rest on stationary supporting-surfaces, said rolling segments being located exterior to and above the level of the span-floor which meets the approach floor or roadway, said span having trusses which are extended past the upper or outer ends of said rolling segments and counterbalance-weights attached to the projecting parts of the said trusses.

15. A rolling-lift bridge comprising a span or leaf, embracing trusses, a span-floor supported thereby, rolling segments attached to said trusses, stationary supports for the rolling segments located at either side of the approach floor or roadway, and anchored columns located at the sides of the bridge-approach, the upper parts of said trusses being extended beyond the rolling segments and being adapted for contact with downwardly-facing stops attached to said anchored columns.

16. A rolling-lift bridge embracing a bridge-span consisting of trusses and a span-floor supported thereby, said span having rolling segments attached to the trusses, the upper parts of said trusses being extended beyond the upper and outer ends of said rolling segments, supports for said rolling segments located in either side of the bridge-approach, anchored columns at either side of the said bridge-approach, and a transverse girder attached to the said columns and forming downwardly-facing stops for contact with the projecting parts of the trusses.

17. A rolling-lift-bridge span comprising trusses and a span-floor located between the lower parts of and supported by said trusses, said span being provided with rolling segments forming parts of the trusses and located above and exterior to the end of the span-floor which meets the approach floor or roadway, the top chords of the trusses being extended above and beyond the upper ends of said rolling segments and other truss members connecting the top chords with the rolling segments and forming with said top chords extensions of the trusses adapted for contact with stationary stops limiting the descent of the free ends of the span.

18. A rolling-lift-bridge span or leaf comprising trusses and a span-floor located between the lower parts of and supported by said trusses, rolling segments which form parts of the trusses and are located above and exterior to the end of the span-floor which meets the approach floor or roadway and counterbalance-weights attached to the said trusses with the center of gravity thereof above and exterior to the upper ends of said rolling segments.

19. A rolling-lift-bridge span or leaf comprising trusses and a span-floor located between the lower parts of and supported by said trusses, rolling segments located above and exterior to the end of the span-floor which meets the approach-floor, said rolling segments consisting of sector-shaped beams attached at their lower ends to the ends of the bottom chords of the trusses and connected at their upper ends with the upper chords thereof.

20. A rolling-lift-bridge span or leaf comprising trusses and a span-floor located between the lower parts of and supported by said trusses, rolling segments attached to said trusses above the level of and exterior to the end of the span-floor which meets the approach-floor, and counterbalance-weights attached to said trusses with the center of gravity thereof above and exterior to the ends of the said rolling segments, the upper chords of the said trusses being extended to and serving as supports for the said counterbalance-weights.

21. A rolling-lift-bridge span comprising trusses having horizontal bottom chords, a span-floor supported by said trusses, rolling segments consisting of sector-shaped beams attached at their lower ends to the ends of the lower chords and connected at their upper ends with the top chords, said top chords being extended above and beyond the upper ends of said rolling segments and forming with the truss members extensions of the ends of the trusses above the level of the said segments, and counterbalance-weights attached to said extensions of the trusses.

22. A rolling-lift bridge comprising a span or leaf embracing trusses and a span-floor located between the lower parts of and supported by said trusses, and rolling segments attached to said trusses, and means for operating said span embracing operating devices located over the bridge-approach and connected with the span at a point between the upper parts of the trusses.

23. A bascule-bridge comprising a span or leaf embracing trusses, a span-floor supported thereby and means for operating said span embracing an operating-strut located above the level of the span and approach floors connected with the upper parts of the trusses at a point between the same, and operating devices for said strut located over the bridge-approach.

24. A bascule-bridge span or leaf comprising trusses and an operating-strut located between said trusses and connected with the upper parts of the same, said span being provided with oblique braces extending from the trusses to the parts on the span to which said strut is pivotally connected, and actuating devices for said strut.

25. A rolling-lift-bridge span or leaf comprising two trusses, and rolling segments attached to the trusses, in combination with an operating-strut connected with the trusses at a point between the same and in line with the centers of the rolling segments, oblique braces extending from the trusses to the end of the operating-strut, and actuating devices for the operating-strut.

26. A bascule-bridge span or leaf comprising two trusses in combination with an operating-strut which is connected with the upper part of said trusses at a point between the same, said operating-strut being provided with a rack-bar, operating devices for said strut embracing a gear-pinion intermeshing with said rack-bar and a supporting-roller on which the outer end of said operating-strut rests and rolls.

27. A bascule-bridge comprising a span provided with downwardly-facing stops on the bridge approach or abutment adapted for contact with projecting parts of the span, and means for actuating the span comprising an operating-strut pivotally connected with the upper part of the span, actuating devices for giving endwise movement to said strut and supporting-girders for the operating devices arranged longitudinally over the approach-roadway, said girders being suspended at their ends nearest the span by suspension members the upper ends of which are attached to an overhead support at points between said downwardly-facing stops.

28. A bascule-bridge embracing a bridge-span, anchored columns at either side of the bridge-approach, a transverse girder attached to the said columns and forming at the ends thereof downwardly-facing stops for contact with projecting parts of the span, means for actuating the span comprising an operating-strut pivotally connected with the upper part of the span, actuating devices for giving endwise movement to the said strut and supporting-girders to the said operating devices arranged longitudinally over the approach-roadway, said girders being suspended at their ends nearest the bridge-span by suspension members attached to the said transverse girder inside of the said columns.

29. A double-deck bascule-bridge embracing two approach-roadways and a lifting-span provided with two floors, the supporting means for the span being so located with respect to the meeting ends of the approach-roadways and span-floors, that the said span-floors move upwardly and outwardly from the approach in the lifting of the span.

30. A two-deck rolling-lift bridge or span provided with rolling segments adapted to rest on supporting-surfaces located at the sides of the bridge-approach, said rolling segments being located above the uppermost bridge-floor and exterior to the ends of both bridge-floors which meet the approach floors or roadways.

31. A double-deck bascule-bridge comprising a lifting-span having upper and lower floors and a bridge-approach having corresponding floors or roadways; the span-floors being arranged to meet the approach floors or roadways adjacent to the span-support and being arranged to move upwardly and outwardly from the ends of the approach floors or roadways in the opening of the bridge.

In testimony that we claim the foregoing as our invention we affix our signatures, in presence of two witnesses, this 15th day of November, A. D. 1901.

ALBERT H. SCHERZER.
  CHARLES F. T. KANDELER.

Witnesses:
 C. CLARENCE POOLE,
 WILLIAM L. HALL.